(12) United States Patent
Kitada et al.

(10) Patent No.: US 8,088,463 B2
(45) Date of Patent: Jan. 3, 2012

(54) SET OF MATERIAL ROLLS AND METHOD FOR PRODUCTION OF MATERIAL ROLL

(75) Inventors: Kazuo Kitada, Ibaraki (JP); Takuya Nakazono, Ibaraki (JP); Satoru Koshio, Ibaraki (JP); Tomokazu Yura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/423,379

(22) Filed: Apr. 14, 2009

(65) Prior Publication Data
US 2009/0263608 A1  Oct. 22, 2009

(30) Foreign Application Priority Data

Apr. 16, 2008 (JP) ................. 2008-107118
Apr. 2, 2009 (JP) ................. 2009-090269

(51) Int. Cl.
*B32B 9/00* (2006.01)
*B32B 33/00* (2006.01)
(52) U.S. Cl. ..................................... 428/40.1
(58) Field of Classification Search ................. 428/40.1, 428/41.8
See application file for complete search history.

(56) References Cited

U.S. PATENT DOCUMENTS

| | | | |
|---|---|---|---|
| 1,584,450 A | 5/1926 | Hager | |
| 3,985,599 A | 10/1976 | Lepoutre et al. | |
| 5,245,456 A * | 9/1993 | Yoshimi et al. | 349/118 |
| 5,667,624 A | 9/1997 | Akimoto et al. | |
| 6,848,488 B2 | 2/2005 | Choo et al. | |
| 7,022,204 B2 | 4/2006 | Kanbara et al. | |
| 2004/0095526 A1 | 5/2004 | Yamabuchi et al. | |
| 2004/0169809 A1 | 9/2004 | Yamabuchi et al. | |
| 2005/0016670 A1 | 1/2005 | Kanbara et al. | |
| 2006/0062934 A1 | 3/2006 | Hayashi et al. | |
| 2006/0124248 A1 | 6/2006 | Kanbara et al. | |
| 2007/0013858 A1 | 1/2007 | Yamabuchi et al. | |

(Continued)

FOREIGN PATENT DOCUMENTS

EP  1962258 A1  8/2008

(Continued)

OTHER PUBLICATIONS

Japanese Office Action dated Aug. 5, 2009, issued in corresponding Japanese Patent Application No. 2009-090269.

(Continued)

*Primary Examiner* — Patricia Nordmeyer
(74) *Attorney, Agent, or Firm* — Westerman, Hattori, Daniels & Adrian, LLP

(57) ABSTRACT

A set of material rolls is used for the process of bonding their pieces to both sides of an optical display unit, respectively, and includes: a first roll that is a roll of a long sheet material including a first optical film, a pressure-sensitive adhesive layer and a release film laminated in this order, wherein the first optical film includes a polarizing plate, and having undergone a slitting process in a direction parallel to the absorption axis of the polarizing plate so that it has a width corresponding to the short side of the optical display unit; and a second roll that is a roll of another long sheet material with a similar structure having undergone a slitting process in a direction parallel to the absorption axis of the polarizing plate so that it has a width corresponding to the long side of the optical display unit.

2 Claims, 8 Drawing Sheets

U.S. PATENT DOCUMENTS

| | | | |
|---|---|---|---|
| 2007/0200976 | A1 | 8/2007 | Kawamoto et al. |
| 2008/0303639 | A1 | 12/2008 | Ford et al. |
| 2009/0159175 | A1 * | 6/2009 | Nakahira et al. ............... 156/64 |
| 2009/0218049 | A1 | 9/2009 | Kanbara et al. |

FOREIGN PATENT DOCUMENTS

| | | | |
|---|---|---|---|
| JP | 57-052017 | A | 3/1982 |
| JP | 62-14810 | B2 | 4/1987 |
| JP | 08-087007 | A | 4/1996 |
| JP | 11-231129 | A | 8/1999 |
| JP | 2003-161935 | A | 6/2003 |
| JP | 2004-144908 | A | 5/2004 |
| JP | 2004-250213 | A | 9/2004 |
| JP | 2004-262071 | A | 9/2004 |
| JP | 2005-37417 | A | 2/2005 |
| JP | 2007-140046 | A | 6/2007 |
| JP | 2009-122641 | A | 6/2009 |
| TW | 520452 | B | 2/2003 |
| TW | 274914 | B | 3/2007 |
| WO | WO 2007058023 | A1 * | 5/2007 |
| WO | WO 2007058203 | A1 * | 5/2007 |

OTHER PUBLICATIONS

International Search Report of PCT/JP2008/072093, mailing date of Jan. 13, 2009.
Notification of Transmittal of Copies of Translation of the International Preliminary Report on Patentability issued on Jul. 20, 2010 (Form PCT/IB/338) of International Application No. PCT/JP2008/072093 (mailed forms PCT/IB/373 and PCT/ISA/237).
Taiwanese Search Report dated Dec. 24, 2008, issued in corresponding Taiwanese Patent Application No. 097150491.
USPTO Office Action dated Oct. 18, 2010, issued in U.S. Appl. No. 12/770,419.
Taiwanese Search Report dated Apr. 2, 2009, issued in corresponding Taiwanese Patent Application No. 098112545.
U.S. Office Action dated Sep. 16, 2010, U.S. Appl. No. 12/770,371.
Korean Prior Art Search Report dated Dec. 9, 2010, issued in corresponding Korean Patent Application No. 10-2010-7008216.
USPTO Office Action dated Jan. 6, 2011, issued in U.S. Appl. No. 12/770,371.
Korean Office Action mailed on Jan. 11, 2011, issued in corresponding Korean Patent Application No. 10-2010-7008216.
USPTO Office Action dated Mar. 4, 2011, issued in U.S. Appl. No. 12/770,305.
USPTO Office Action dated Dec. 10, 2010, issued in U.S. Appl. No. 12/677,395.
USPTO Office Action (Notice of Allowance) dated May 9, 2011, issued in U.S. Appl. No. 12/770,419.
USPTO Office Action dated Aug. 19, 2011, issued in U.S. Appl. No. 12/855,420.
European Search Report dated Aug. 31, 2011, issued in corresponding European Patent Application No. 10159514.8.
European Search Report dated Aug. 31, 2011, issued in corresponding European Patent Application No. 08868127.5.
European Search Report dated Aug. 31, 2011, issued in corresponding European Patent Application No. 10162700.8.

* cited by examiner

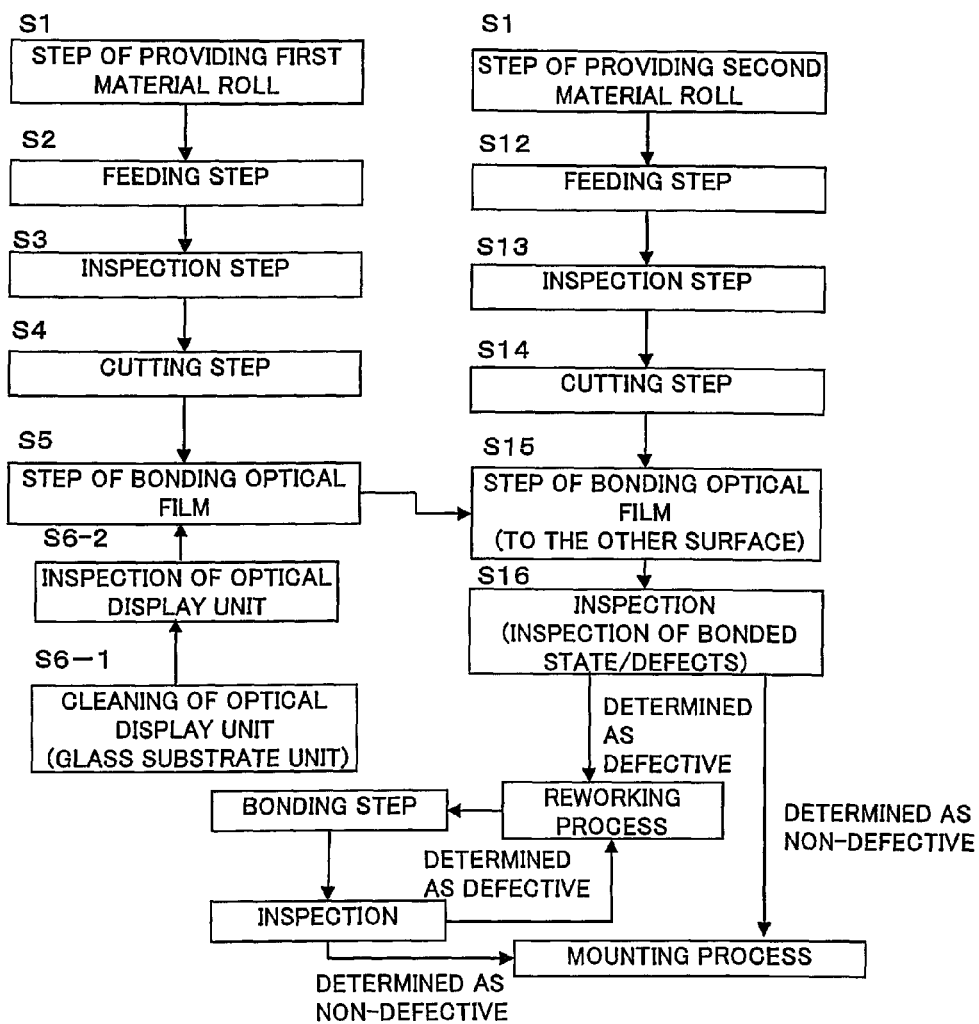

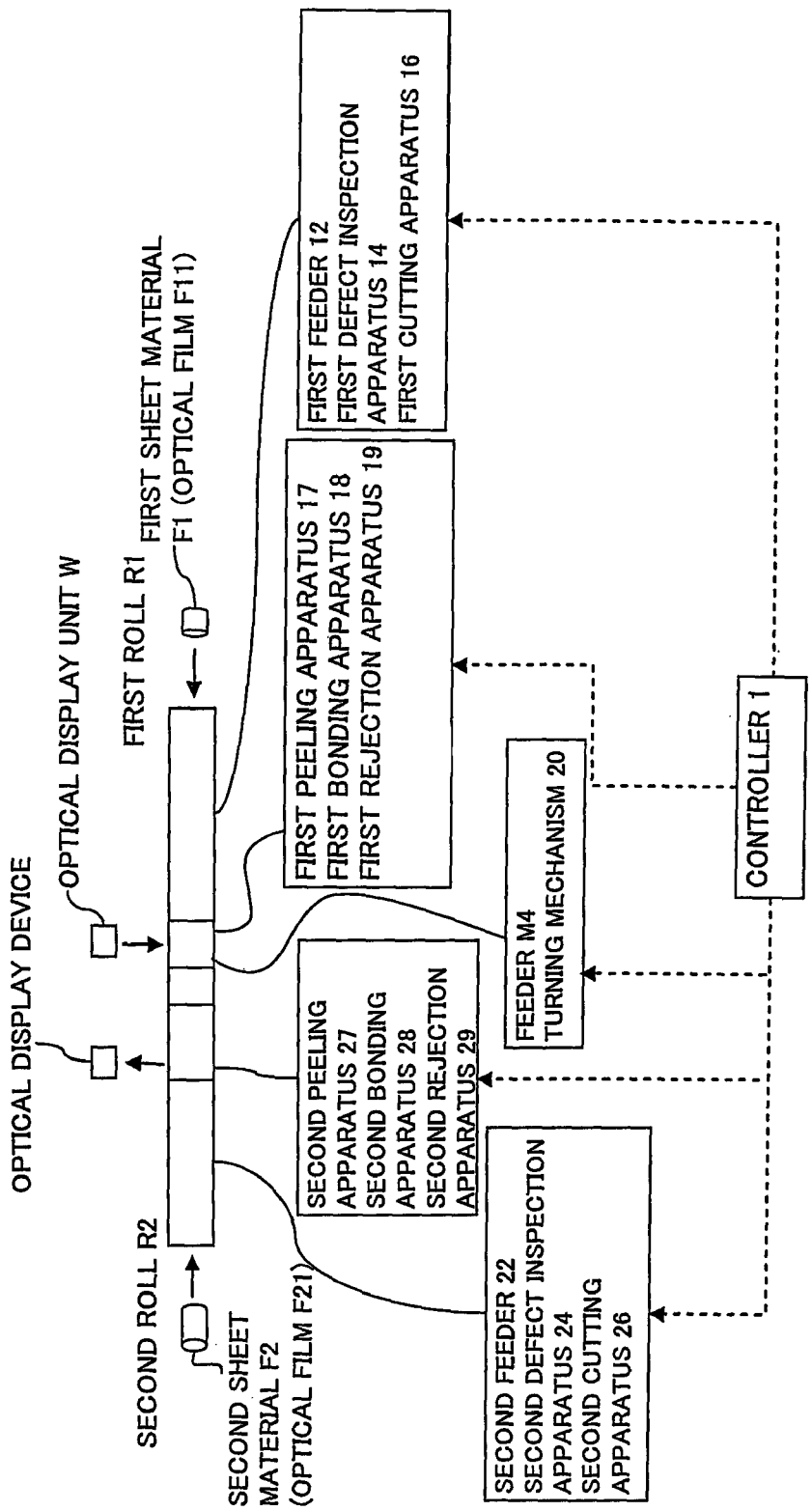
[Fig. 2]

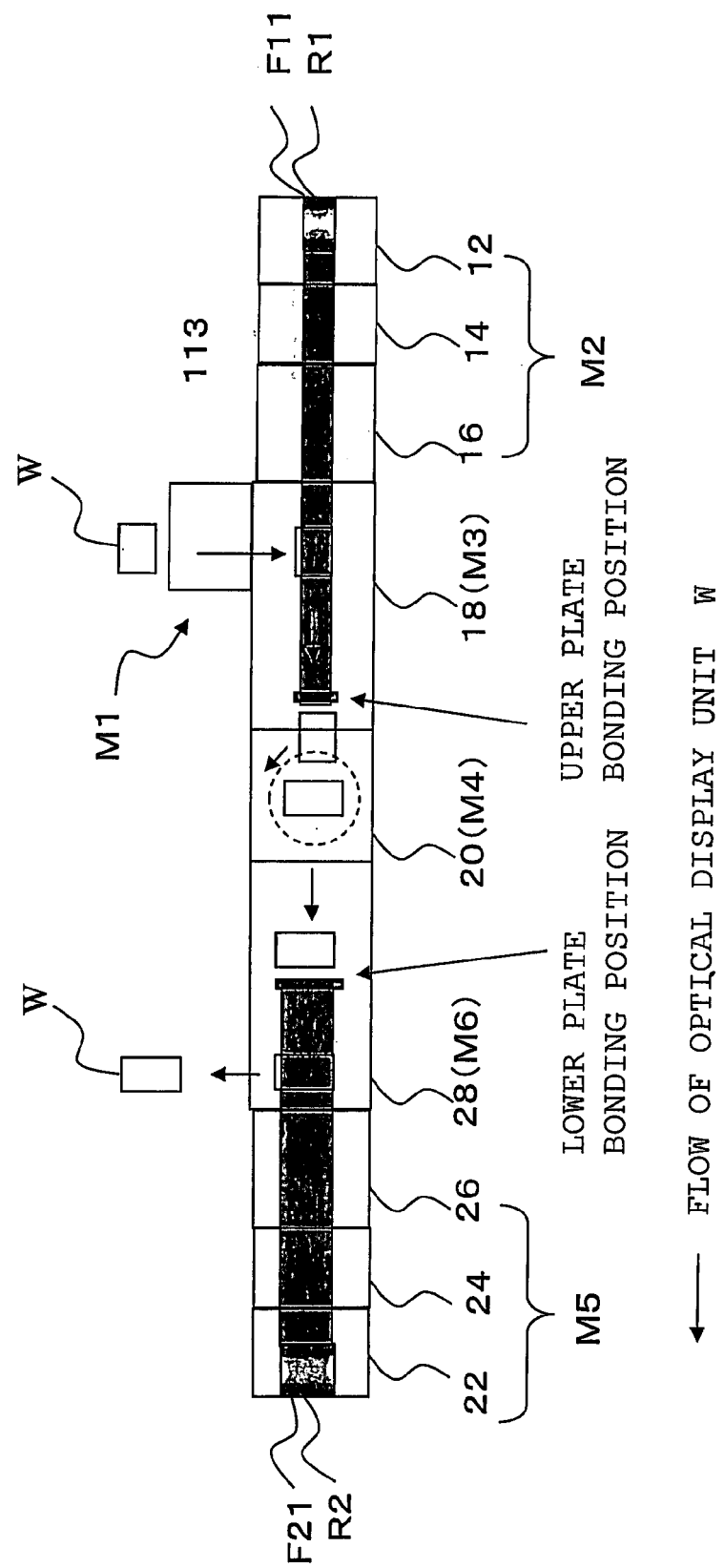
[Fig. 3]

[Fig. 4]
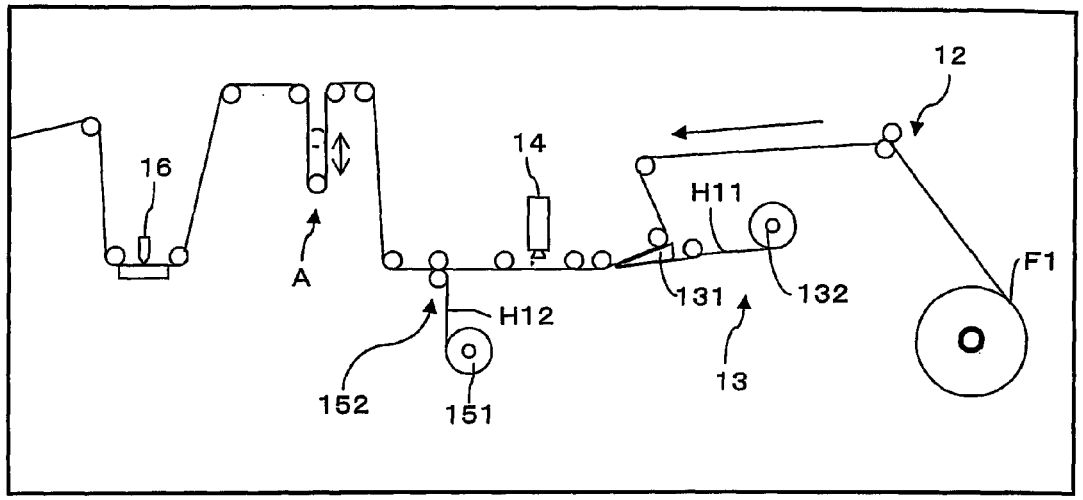
[Fig. 5]
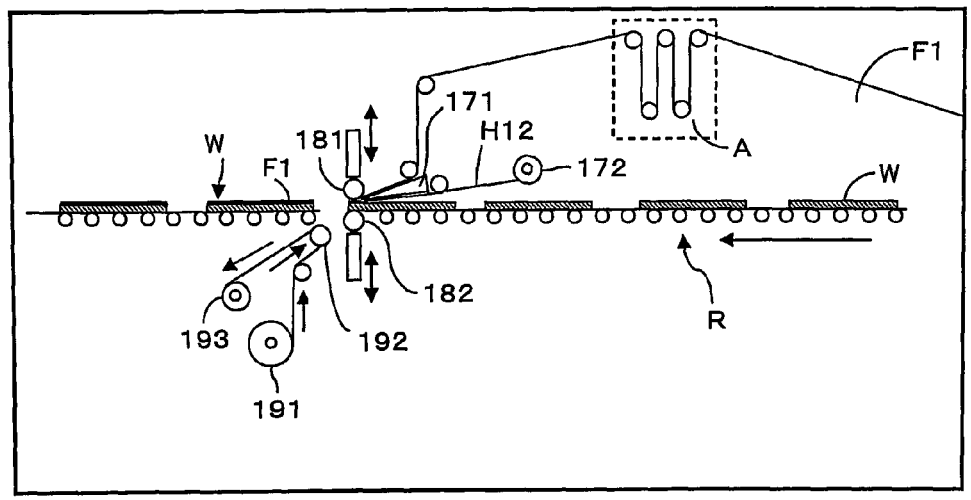

[Fig. 6]
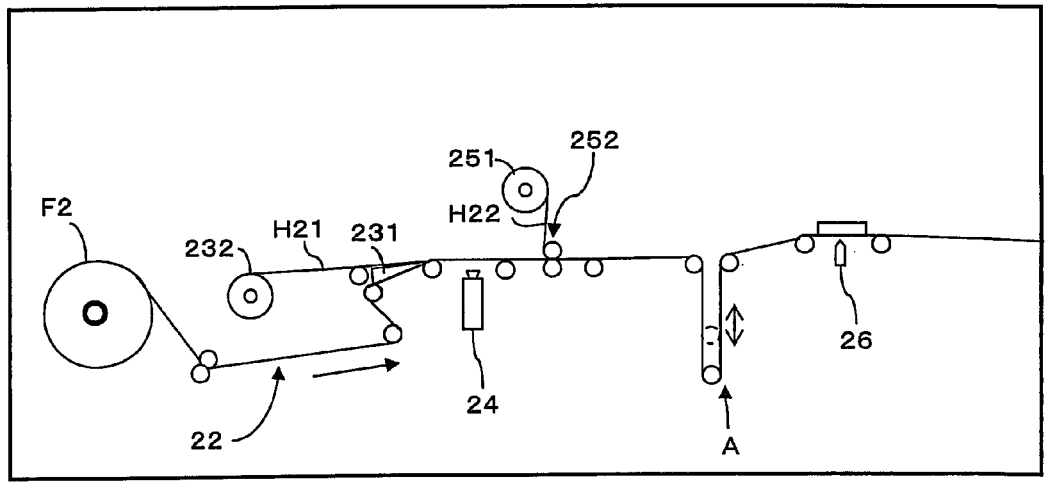
[Fig. 7]
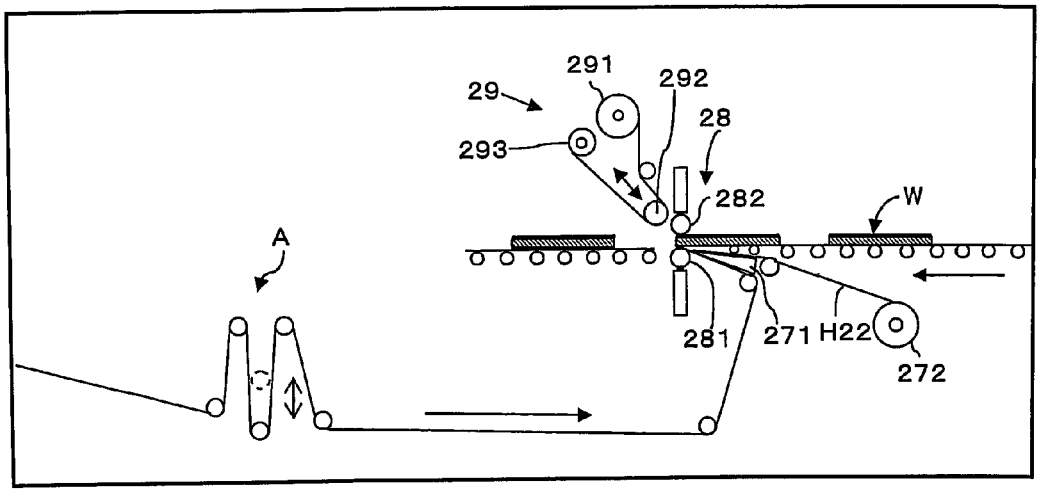

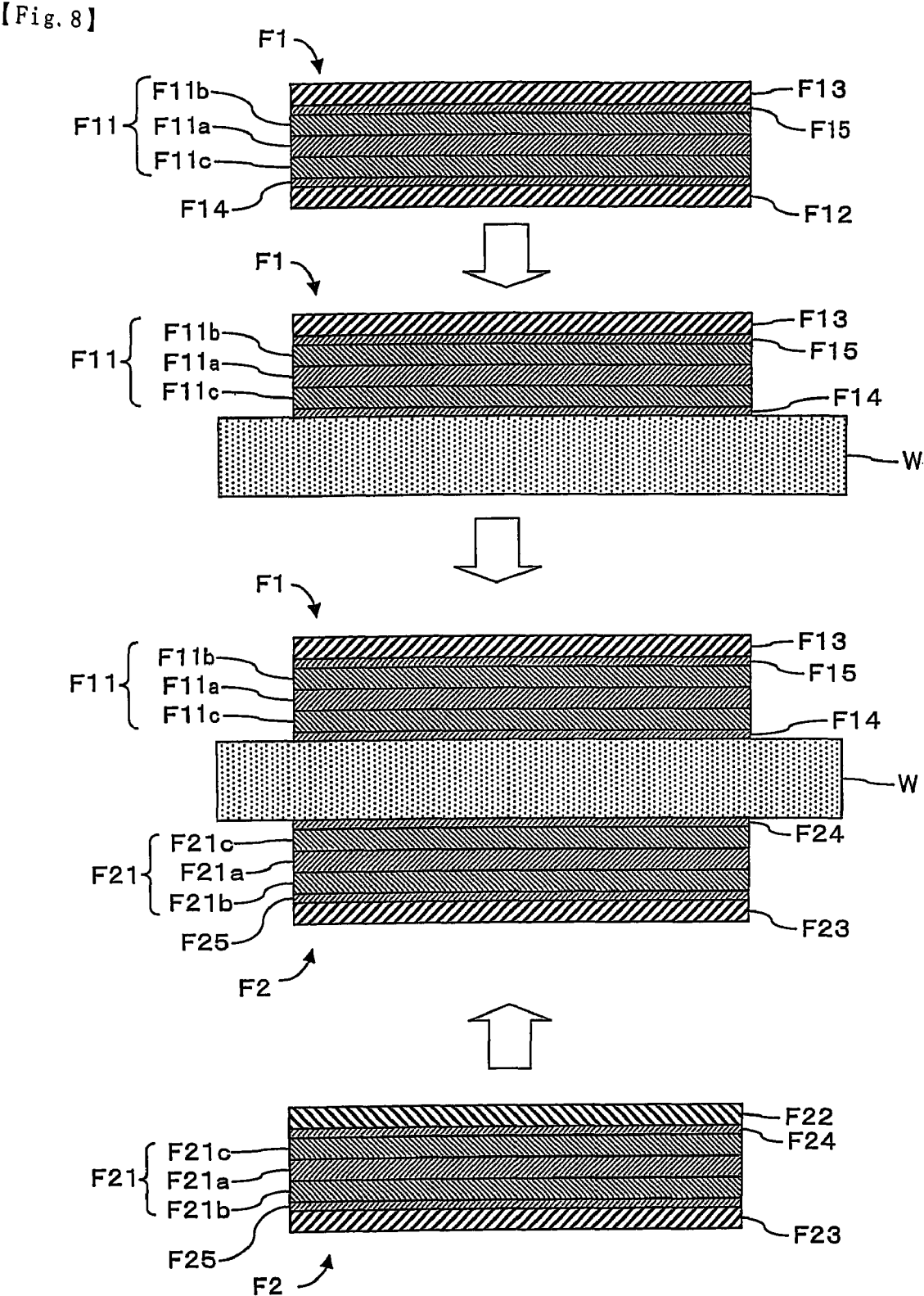
[Fig. 8]

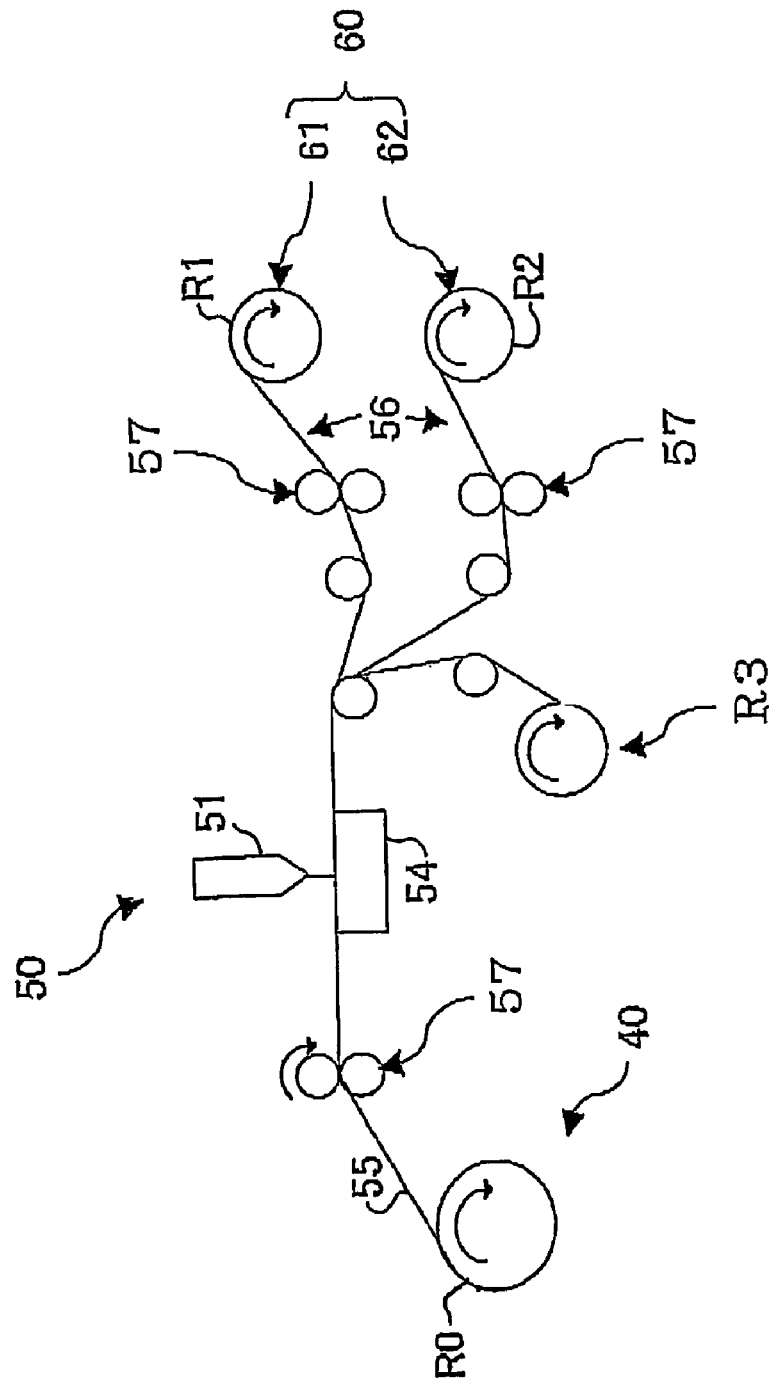
[Fig. 9]

[Fig. 10]
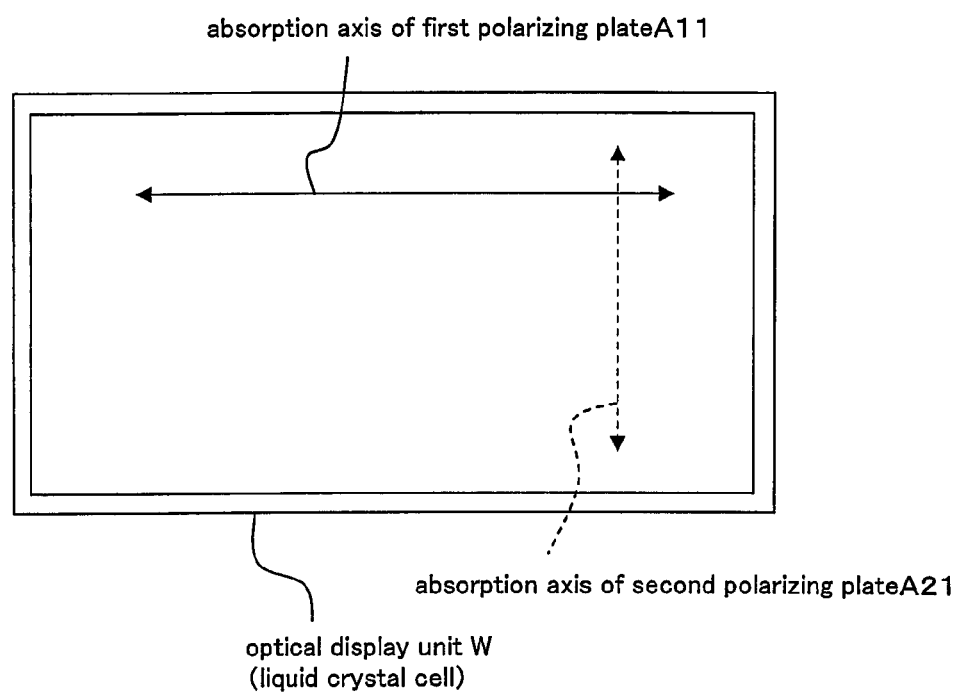

SET OF MATERIAL ROLLS AND METHOD FOR PRODUCTION OF MATERIAL ROLL

BACKGROUND OF THE INVENTION

1. Field of the Invention

The present invention relates to a set of material rolls for use in the process of cutting them, respectively, into specific-length pieces to be bonded to both sides of an optical display unit. The invention also relates to a method for producing a material roll suitable for the production of the set of material rolls and to a method for manufacturing an optical display device using the set of material rolls.

2. Description of the Related Art

A conventional method for manufacturing a liquid crystal display device includes the steps of producing a roll of an optical film by an optical film maker, then cutting the optical film by the maker into a specific length corresponding to the size of an optical display unit to which the film will be bonded, packaging the specific-length film after appearance inspection, end-face preparation and so on, transporting the packaged film to a panel processing manufacturer, inspecting the appearance of the film by the panel processing manufacturer, and then bonding the film to an optical display unit (such as a liquid crystal panel) after cleaning.

Such a manufacturing process particularly requires the steps of preparing the end face, packaging a piece of the sheet material, and unpacking the material, because the optical film maker and the panel processing manufacturer are located at different places. However, such a multi-step process has the problem of an increase in manufacturing cost. There are also problems in which scratches, dust, stains, and so on can be caused by the multi-step process or the transportation so that an inspection process can be necessary, and problems in which different types of sheet materials must be carried and managed.

Japanese Patent Application Laid-Open (JP-A) No. 2007-140046 discloses a production method to solve the problems. The method includes means for feeding a long sheet material from a roll of the long sheet material including an optical film to be used as a component of an optical display device, means for detecting defects in the long sheet material fed from the feeding means, means for cutting the long sheet material into sheet material pieces based on the result of the detection by the detecting means, means for transporting each sheet material piece cut by the cutting means to a bonding process, and means for bonding the transported sheet material piece to an optical display unit as a component of an optical display device, wherein the respective means are arranged on a continuous production line. The long sheet material including the optical film can be directly cut into the desired size, and the cut piece of the sheet material can be directly bonded to the optical display unit. According to a conventional technique, the long sheet material is stamped into pieces, and the stamped sheet material pieces are each carefully packaged and delivered to a panel processing manufacturer. According to this method, however, a roll of the long sheet material may be directly packaged and delivered.

SUMMARY OF THE INVENTION

However, the system disclosed in JP-A No. 2007-140046 for production of an optical display device does not include any additional apparatus for bonding another optical film to the other side of the optical display unit after the bonding of an optical film to one side of the optical display unit. JP-A No. 2007-140046 is not considered about the direction or width of optical films to be bonded to both sides of the optical display unit.

The absorption axes of upper and lower polarizing plates bonded to the upper and lower sides of the optical display unit should have different directions (orthogonal to each other). Therefore, in order to bond polarizing plates to the upper and lower sides in the same system, the direction of the absorption axis of one roll of a polarizing plate must differ by 90° from that of the other roll of a polarizing plate. However, when a material roll having an absorption axis in the width direction of the roll is produced, it is generally difficult to control the direction of the absorption axis with high accuracy, and therefore, a problem may occur in which the optical display device obtained after the bonding process may suffer from light leakage or the like and have insufficient optical properties.

Therefore, an object of the invention is to provide: a set of material rolls including two rolls that can be used simply by cutting each of them into a predetermined length and then can be bonded with high axis accuracy to an optical display unit in such a manner that their absorption axes can be orthogonal to each other, and to provide a method for producing a material roll suitable for the production of the set of material rolls and a method for manufacturing an optical display device with the set of material rolls.

The objects are achieved by the invention described below. Specifically, the invention is directed to a set of material rolls for use in the process of cutting them, respectively, into specific-length pieces to be bonded to both sides of an optical display unit, including: a first roll that is a roll of a long sheet material including a first optical film, a pressure-sensitive adhesive layer and a release film laminated in this order, wherein the first optical film includes a polarizing plate, and having undergone a slitting process in a direction parallel to the absorption axis of the polarizing plate so that it has a width corresponding to the short side of the optical display unit; and a second roll that is a roll of a long sheet material including a second optical film, a pressure-sensitive adhesive layer and a release film laminated in this order, wherein the second optical film includes a polarizing plate, and having undergone a slitting process in a direction parallel to the absorption axis of the polarizing plate so that it has a width corresponding to the long side of the optical display unit.

In the material roll set of the invention, the first roll has undergone a slitting process so that it has a width corresponding to the short side of the optical display unit, and the second roll has undergone a slitting process so that it has a width corresponding to the long side of the optical display unit. When these rolls are used at the same time, optical films of sizes corresponding to the short and long sides of the optical display unit can be obtained, respectively, simply by cutting them in lengths corresponding to the long and short sides, respectively. Since each of the rolls has an absorption axis in the longitudinal direction, the bonding process can be performed with high axis accuracy, so that an optical display device with a high level of optical properties can be produced after the bonding process. In addition, one of the optical films has an absorption axis parallel to the long side of the optical display unit, and the other has an absorption axis parallel to the short side. Therefore, the absorption axes of the optical films can be made orthogonal to each other simply by bonding them to the upper and lower sides of the optical display unit, respectively. Consequently, there is provided a set of material rolls including two rolls that can be used simply by cutting each of them into a predetermined length and then can be bonded with high axis accuracy to an optical display unit in such a manner that their absorption axes can be orthogonal to each other.

In the above process, the optical display unit to be used in bonding is preferably a VA or IPS mode liquid crystal panel. Particularly when the optical display unit includes a VA or IPS mode liquid crystal panel, which has been used for large screen TVs or the like in recent years, the polarizing plates of the first and second optical films should be so placed that their absorption axes can be orthogonal to each other and can be parallel to the directions of the long and short sides of the optical display unit Therefore, the first and second rolled materials each having undergone a slitting process in a direction parallel to the absorption axis only have to be unwound and cut in the width direction, so that a high production rate can be achieved.

The invention is also directed to a method for producing a material roll for use in the process of cutting it into a specific-length piece to be bonded to the surface of an optical display unit, including the steps of: lengthwise slitting a long material including an optical film, a pressure-sensitive adhesive layer and a release film laminated in this order, wherein the optical film includes a polarizing plate, and having a longitudinal direction parallel to the absorption axis of the polarizing plate, so that a long sheet material having a width corresponding to the short or long side of the optical display unit is obtained; and winding the long sheet material into a roll.

In the method of the invention for producing a material roll, the material undergoes a slitting process so as to have a width corresponding to the short or long side of the optical display unit. Therefore, an optical film of a size corresponding to the short or long side of the optical display unit can be obtained only by cutting the product into a length corresponding to the long or short side. In addition, the long material used has a longitudinal direction parallel to the absorption axis of the polarizing plate, and therefore, bonding can be performed with high axis accuracy in the manufacturing process, so that an optical display device having a high level of optical properties can be obtained after the bonding process.

The invention is also directed to a method for manufacturing an optical display device including an optical display unit and an optical film that includes a polarizing plate and is bonded to the optical display unit, including: a first cutting and bonding process including cutting the material from the first roll of the set of material rolls described above to form an optical film having a length corresponding to the long side of the optical display unit and then bonding the optical film to one surface of the optical display unit; and a second cutting and bonding process including cutting the material from the second roll of the set of material rolls described above to form an optical film having a length corresponding to the short side of the optical display unit and then bonding the optical film to the other surface of the optical display unit.

In the method of the invention for manufacturing an optical display device, the first roll has undergone a slitting process so that it has a width corresponding to the short side of the optical display unit, and the second roll has undergone a slitting process so that it has a width corresponding to the long side of the optical display unit. When these rolls are used at the same time, therefore, optical films of sizes corresponding to the short and long sides of the optical display unit can be obtained, respectively, simply by cutting them in lengths corresponding to the long and short sides, respectively. Since each of the rolls has an absorption axis in the longitudinal direction, the bonding process can be performed with high axis accuracy, so that an optical display device with a high level of optical properties can be produced after the bonding process. In addition, one of the optical films has an absorption axis parallel to the long side of the optical display unit, and the other has an absorption axis parallel to the short side. Therefore, the absorption axes of the optical films can be made orthogonal to each other only by bonding them to the upper and lower sides of the optical display unit, respectively.

Particularly in the case of IPS mode, since the liquid crystal director is usually parallel or orthogonal to the side of LC panel in non-electric field, it is very important for obtaining a black display to bond a polarizing plate so that the director is parallel to an absorption axis of the polarizing plate. If this angle shifts, the influence of the retardation in the liquid crystal panel will arise, an optical leakage is induced, and the fall of a contrast ratio is caused. Since in this invention the direction of the absorption axis of a polarizing plate is parallel to the long side or the short side of the optical film and is bonded parallel to the short side or the long side of a liquid crystal panel, the direction of the liquid crystal director of LCD and the direction of the absorption axis can be coincided easily.

Consequently, there is provided an optical display device manufacturing method in which two rolls can be used simply by cutting each of them into a predetermined length, and the cut pieces can be bonded with high axis accuracy to the optical display unit in such a manner that their absorption axes can be orthogonal to each other.

The method preferably further includes the step of turning the optical display unit having undergone the first cutting and bonding process to the direction of bonding in the second cutting and bonding process or turning the optical display unit having undergone the second cutting and bonding process to the direction of bonding in the first cutting and bonding process. The turning step avoids the necessity for perpendicularly arranging the first roll feeding direction and the second roll feeding direction, so that the production system can save space. The turning step may also be used to set an appropriate bonding angle in the first or second cutting and bonding process.

In addition, the step of cutting and rejecting defective portions is also preferably performed when the first and second optical films are formed by cutting. Defective portions of the optical film can be eliminated by the rejecting step so that the yield of the optical film can be improved after the bonding process.

For the reason described above, the optical display unit is preferably a VA or IPS mode liquid crystal panel.

BRIEF DESCRIPTION OF THE DRAWINGS

FIG. 1 is a flow chart showing a process for a production system for use in an embodiment of the invention;

FIG. 2 is a chart for illustrating an example of the production system for use in an embodiment of the invention;

FIG. 3 is a diagram for illustrating an example of the production system for use in an embodiment of the invention;

FIG. 4 is a diagram for illustrating the configuration of an example of the production system for use in an embodiment of the invention;

FIG. 5 is a diagram for illustrating the configuration of an example of the production system for use in an embodiment of the invention;

FIG. 6 is a diagram for illustrating the configuration of an example of the production system for use in an embodiment of the invention;

FIG. 7 is a diagram for illustrating the configuration of an example of the production system for use in an embodiment of the invention;

FIG. 8 is a diagram for illustrating an example of the laminated structure of first and second optical films; and FIG. 9 is a schematic front view showing an example of the manufacturing apparatus for use in the material roll production method of the invention.

FIG. 10 is a schematic plan view showing a VA or IPS mode liquid crystal panel and a direction of an absorption axis of the polarizing plate bonded to the both sides thereof.

DETAILED DESCRIPTION OF THE PREFERRED EMBODIMENTS

Some embodiments of the invention are described in detail below.

Material Rolls

As shown in FIG. 3, the set of material rolls according to the invention is for use in the process of cutting them, respectively, into specific-length pieces to be bonded to both sides of an optical display unit and includes a first roll R1 and a second roll R2.

The first roll R1 is a roll of a long sheet material including a first optical film F11, a pressure-sensitive adhesive layer and a release film laminated in this order, wherein the first optical film F11 includes a polarizing plate, and having undergone a slitting process in a direction parallel to the absorption axis of the polarizing plate so that it has a width corresponding to the short side of the optical display unit. The long sheet material is preferably wound on a core such as a core tube, while it may be wound alone.

The second roll R2 is a roll of a long sheet material including a second optical film F21, a pressure-sensitive adhesive layer and a release film laminated in this order, wherein the second optical film F21 includes a polarizing plate, and having undergone a slitting process in a direction parallel to the absorption axis of the polarizing plate so that it has a width corresponding to the long side of the optical display unit. The long sheet material is preferably wound on a core such as a core tube, while it may be wound alone.

As used herein, the phrase "corresponding to the long side of the optical display unit" or "corresponding to the short side of the optical display unit" means that the length of the optical film to be bonded (exclusive of the length of the exposed portion) corresponds to the length of the long or short side of the optical display unit and is not necessarily the same as the length of the long or short side of the optical display unit.

In an embodiment of the invention, the materials of the first and second rolls R1 and R2 have both undergone a slitting process in a direction parallel to the absorption axis of the polarizing plate, which forms each of them, and therefore each has an absorption axis in the longitudinal direction of each rolled material. Therefore, bonding is performed with high axis accuracy so that an optical display device with good optical properties can be provided after the bonding process. Particularly when the optical display unit includes a VA or IPS mode liquid crystal panel, which has been used for large screen TVs or the like in recent years, the polarizing plates of the first and second optical films should be so placed that their absorption axes can be orthogonal to each other, and therefore, the first and second rolled materials each having undergone a slitting process in a direction parallel to the absorption axis only have to be unwound and cut in the width direction, so that a high production rate can be achieved.

For example, the influence of the axis accuracy during bonding on the optical properties may be evaluated using the transmitted light intensity and contrast ratio (CR) described below. Specifically, a first roll of a polarizing plate (CAT1463DU manufactured by Nitto Denko Corporation) having undergone a slitting process in a direction parallel to its absorption axis and a second roll of another polarizing plate having undergone a slitting process at a certain angle with respect to its absorption axis were each cut into a square sample piece (50 mm×50 mm) having a side parallel to the slitting direction. The two sample pieces were laminated, and the transmittance of the resulting laminate was measured using a spectrophotometer U-4100 manufactured by Hitachi High-Technologies Corporation. The result is shown in Table 1.

TABLE 1

| | Axis angle | Transmitted light intensity | CR |
|---|---|---|---|
| Comparative Example 1 | 60 | 59.04759 | 1.693549 |
| Comparative Example 2 | 67.5 | 77.96201 | 1.282676 |
| Comparative Example 3 | 82.5 | 19.6158 | 5.097931 |
| Example 1 | 90 | 0.0413607 | 2417.754 |
| Comparative Example 4 | 97.5 | 20.27872 | 4.931278 |
| Comparative Example 5 | 112.5 | 78.09852 | 1.280434 |
| Comparative Example 6 | 120 | 56.95775 | 1.755687 |

The result of Table 1 shows that, as compared Example 1 having the angle of 90° between the absorption axes with Comparative Examples having the angle between the absorption axes deviating from 90°, even when the angle between the absorption axes slightly deviates from 90°, light leakage (the transmitted light intensity) becomes significant, and the contrast ratio (CR) is significantly reduced.

Long Sheet Material

Any optical film including a polarizing plate may be used to form the long sheet material. For example, such an optical film may be a polarizing plate or a laminate of a polarizing plate and one or more of a retardation film and a brightness enhancement film. The polarizing plate may be of any type, as long as it includes a polarizer. The polarizing plate may include a polarizer and a polarizer protecting film (transparent protective film) provided on one or both sides thereof.

A protective transparent film may be placed on the surface of the optical film. A pressure-sensitive adhesive layer is formed on one surface of the optical film so that the optical film can be attached to something such as an optical display unit, and a release film is provided to protect the pressure-sensitive adhesive layer. For example, a surface protecting film may also be provided on the other surface of the optical film with a pressure-sensitive adhesive layer interposed therebetween.

Specifically, each optical film may have the structure shown in FIG. 8. For example, the laminated structure of the first sheet material F1 includes a first optical film F11, a first release film F12, and a surface protecting film F13. The first optical film F11 includes a first polarizer F11a, a first film F11b provided on one side thereof with an adhesive layer (not shown) interposed therebetween, and a second film F11c provided on the other side thereof with another adhesive layer (not shown).

For example, the first and second films F11b and F11c are each a polarizer protecting film (such as a triacetylcellulose film or a PET film). The second film F11c is bonded to the surface of an optical display unit with a first pressure-sensitive adhesive F14 interposed therebetween. The first film F11b may be surface-treated. Examples of the surface treatment include hard coating, anti-reflection treatment, anti-sticking treatment, diffusion treatment, antiglare treatment, and surface treatment for any other purpose. The first release film F12 is provided on the second film F11c with the first pressure-sensitive adhesive layer 14 interposed therebetween. The surface protecting film F13 is provided on the first film F11b with a pressure-sensitive adhesive layer F15 interposed therebetween. Specific structures of the first and second films F11b and F11c are described later. Hereinafter, the laminated structure of the polarizer and the polarizer protecting film(s) is also referred to as polarizing plate.

The laminated structure of the second sheet material F2 may be the same as, but not limited to, that of the first sheet material. The second sheet material F2 includes a second optical film F21, a second release film F22, and a surface protecting film F23. The second optical film F21 includes a second polarizer F21a, a third film F21b provided on one side thereof with an adhesive layer (not shown) interposed therebetween, and a fourth film F21c provided on the other side thereof with another adhesive layer (not shown) interposed therebetween.

For example, the third and fourth films F21b and F21c are each a polarizer protecting film (such as a triacetylcellulose film or a PET film). The fourth film F21c is bonded to the surface of the optical display unit with a second pressure-sensitive adhesive layer F24 interposed therebetween. The third film F21b may be surface-treated. Examples of the surface treatment include hard coating, anti-reflection treatment, anti-sticking treatment, diffusion treatment, antiglare treatment, and surface treatment for any other purpose. The second release film F22 is provided on the fourth film F21c with the second pressure-sensitive adhesive layer F24 interposed therebetween. The surface protecting film F23 is provided on the third film F21b with a pressure-sensitive adhesive layer F25 interposed therebetween.

In addition, it is also possible to use the set of material rolls to which defect information was given in advance. In such a case, an in-line inspection process can be made unnecessary. For example, it becomes possible to cut avoiding the defect because marking of the defect information is carried out in advance to the material rolls and it can be read to make it reflected in a cutting process.

Methods for Producing Material Rolls

The width of each of the first and second rolls depends on the size of the optical display unit to be bonded. Specifically, the width of the first roll R1 is determined corresponding to the short side of the optical display unit, and the width of the second roll R2 is determined corresponding to the long side thereof. Therefore, the first and second rolls R1 and R2 generally have different widths. Material rolls (long materials) having undergone no slitting process are each previously subjected to a slitting process so as to have a specific width, and the materials each with the specific width are used.

The method of slitting the material roll may be performed with or without rewinding, and any of the slitting method with rewinding and that without rewinding may be used. In an embodiment of the invention, the slitting process may also be performed on the long sheet material production line before the material is wound.

Therefore, the production method of the invention is preferably used to produce the material rolls of the invention. The method of the invention for producing a material roll for use in the process of cutting it into a specific-length piece to be bonded to the surface of an optical display unit includes: lengthwise slitting a long material including an optical film, a pressure-sensitive adhesive layer and a release film laminated in this order, wherein the optical film includes a polarizing plate, and having a longitudinal direction parallel to the absorption axis of the polarizing plate, so that a long sheet material having a width corresponding to the short or long side of the optical display unit is obtained; and winding the long sheet material into a roll.

FIG. 9 shows an exemplary material roll manufacturing apparatus that may be used in the production method of the invention. The manufacturing apparatus includes an unwinding mechanism 40 to unwind a roll R0 of a long material 55, a slitting mechanism 50 to slit the long material 55, and a winder 60 to wind the materials into rolls R1 and R2, respectively. When the slitting process is performed on the long sheet material production line, the unwinding mechanism 40 is not necessary.

The unwinding mechanism 40 unwinds the long material 55 from the roll R0 according to the tension by nip rollers 57. It includes nip rollers 57 and a roll support to support and rotate the roll R0. The roll support may have a breaking mechanism, a driving mechanism, a tension controlling mechanism, and so on.

The slitting mechanism 50 includes a slitting table 54 placed under the long material 55 and a laser 51 placed above the long material 55. The laser irradiation position is fixed, and the long material 55 is continuously fed so that slitting proceeds. The laser 51 may be replaced by a slitter having a slitting blade or the like. In such a case, for example, a rotatable circular slitting blade may be oriented in the slitting direction and placed at a predetermined interval, and the long material 55 may be allowed to pass between the supported roll and the slitting blade so that slitting can be continuously performed.

The slitting mechanism 50 may be placed at each of positions along the width of the long material 55 (the drawing shows only a single position), and they may be shifted along the width direction of the long material 55 so that the slitting width can be changed, and then fixed. For example, the slitting mechanism 50 may be placed at each of three positions, and the two intervals between the irradiation positions may be set to correspond to the short and long sides of the optical display unit so that the material roll set of the invention, namely the rolls R1 and R2, can be produced at the same time.

The winder 60 is an apparatus to wind the slit materials into rolls R1 and R2, respectively. One or more winders 60 may be provided depending on the number of the rolls to be formed after slitting. An additional winder to wind a scrap material in the same manner is preferably provided. In FIG. 9, the winder to wind a scrap material into a roll R3 is equipped.

For example, the winder 60 includes winding units 61 and 62 to wind the materials into the rolls R1 and R2, respectively, and each winding unit has a rotary drive mechanism capable of controlling tension. The winding units 61 and 62 each have the function of fixing the core of each of the rolls R1 and R2. In the winder 60, for example, the long sheet materials 56 obtained after slitting may be wound at a constant speed by the winding units 61 and 62, respectively, while the speed may be controlled by nip rollers 57 placed upstream of the winding units 61 and 62.

Optical Display Unit

Examples of the optical display unit for use in an embodiment of the invention include a liquid crystal cell-glass substrate unit and an organic electroluminescent (EL) light-emitting unit. In an embodiment of the invention, an optical display unit having a rectangular external shape is effectively used. For example, an optical display unit with a long side/short side ratio of 16/9 or 4/3 may be used. An optical film or any other member may be previously integrated to form a laminate in the optical display unit.

Production Flow Chart

FIG. 1 shows an example of the flow chart of a method for manufacturing an optical display device. FIG. 2 shows a schematic diagram of an example of the optical display device production system. FIG. 3 shows a plan layout view of an example of the optical display device production system.

The method of the invention for manufacturing an optical display device is a method for manufacturing an optical display device including an optical display unit and an optical film that includes a polarizing plate and is bonded to the optical display unit. The manufacturing method of the invention includes a first cutting and bonding process and a second cutting and bonding process, wherein any one of these processes may be performed first, or these processes may be performed at the same time or substantially the same time.

The first cutting and bonding process includes cutting the material from the first roll to form a first optical film having a length corresponding to the long side of the optical display unit and then bonding the first optical film to one surface of the optical display unit.

The second cutting and bonding process includes cutting the material from the second roll to form a second optical film having a length corresponding to the short side of the optical display unit and then bonding the second optical film to the other surface of the optical display unit.

More specifically, the method of the invention for manufacturing an optical display device includes: a first cutting and bonding process including cutting a long sheet material including a first optical film being unwound from a roll of the long sheet material so that a piece with a specific length is obtained and then bonding the piece to one surface of the optical display unit, while feeding it; and a second cutting and bonding process including cutting a long sheet material including a second optical film being unwound from a roll of the long sheet material so that a piece with a specific length is obtained and then bonding the piece to the other surface of the optical display unit, while feeding it.

For example, the first cutting and bonding process may be carried out through the steps of feeding (2) to first optical film bonding (5) described below, and the second cutting and bonding process may be carried out through the steps of feeding (8) to second film bonding (11) described below.

(1) Step of Providing First Material Roll (S1 in FIG. 1). The first roll of the first long sheet material described above is provided.

Each step described below is preferably performed in an isolated equipment in a factory so that the cleanliness can be maintained. In particular, the cleanliness is preferably maintained in the step of bonding the optical film to the optical display unit.

(2) Feeding Step (S2 in FIG. 1). The first sheet material F1 is unwound and fed from the prepared and placed first roll to the downstream side. For example, a first feeder 12 to feed the first sheet material F1 includes a pair of nip rollers, a tension roller, a rotary drive, an accumulator A, a sensor, a controller, and so on.

(3) First Inspecting Step (S3 in FIG. 1). The first sheet material F1 is inspected for defects with a first defect inspection apparatus 14. The defect inspection method may be a method of performing imaging and image processing on both sides of the first sheet material F1 with transmitted light or reflected light, a method of performing imaging and image processing with a polarizing film for inspection arranged in crossed nicols relation (also referred to as "0° cross") with the polarization axis of the polarizing plate (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing plate (the object to be inspected) between a CCD camera and the object. Known methods may be used for the image processing algorithm. For example, defects may be detected by grayscale determination based on binarization.

The method of performing imaging and image processing with transmitted light allows the detection of contaminants in the first sheet material F1. The method of performing imaging and image processing with reflected light allows the detection of contaminants deposited on the surface of the first sheet material F1. In the method of performing imaging and image processing with 0° cross, surface contaminants, dirt, and interior contaminants can generally be detected as bright spots. In the method of performing imaging and image processing with X° cross, knicks can generally be detected.

Defect information detected by the first defect inspection apparatus 14 is associated with the positional information (such as position coordinates) and sent to the controller 1 so that it can contribute to the cutting process with a first cutting apparatus 16 as described later.

(4) First Cutting Step (S4 in FIG. 1). The first cutting apparatus 16 cuts each of the surface protecting film F13, the pressure-sensitive adhesive layer F15, the first optical film F11, and the first pressure-sensitive adhesive layer F14 into a specific size without cutting the first release film F12. As a result, the first release film F12 can be used as a carrying medium for the first optical film F11. In a preferred embodiment of the invention, therefore, the release film provided on the optical film with the pressure-sensitive adhesive layer interposed therebetween is used as a carrying medium, when the first and second optical films F11 and F21 are transported and supplied in the first and second cutting and bonding processes, respectively.

Concerning the length of the cut, the optical film is cut into a length corresponding to the long side, because the first roll has a width corresponding to the short side. Concerning this embodiment, FIG. 3 shows an exemplary case where the first material roll (the first sheet material F1) has a width corresponding to the short side of the optical display unit W.

For example, the cutting means may be a laser, a cutter, or any other known cutting means. The cutting means may be configured so that defects can not be included in the domain to be bonded on the optical display unit W by cutting based on the defect information obtained by the first defect inspection apparatus 14. This can significantly improve the yield of the first sheet material F1. Thus, the system which avoids and cuts the defect so that the defect might not be included in the domain to be bonded on the optical display unit W was called the "skip cut". In the "skip cut" process, the defect information upon cutting may be acquired with in-line defect inspection equipment or from a roll material to which it is attached in advance. The system may be configured so that the first sheet material F1 containing any defect can be rejected by a first rejection apparatus 19 as described later so as not to be bonded to the optical display unit W. In a preferred embodiment of the invention, therefore, the process of feeding each of the first and second optical films F11 and F12 includes the step of cutting and rejecting a defect-containing part of the optical film.

(5) First Optical Film Bonding Step (S5 in FIG. 1). While the first release film F12 is removed using a first peeling apparatus 17, the first optical film F11 separated from the first release film F12 is bonded to the optical display unit W with the first pressure-sensitive adhesive layer F14 interposed therebetween using a first bonding apparatus 18. In the bonding step, the first optical film F11 and the optical display unit W may be press-bonded between a pair of rolls (181, 182) as described later.

(6-1) Cleaning Step (S6-1 in FIG. 1). For example, the surface of the optical display unit W is cleaned using a polishing cleaning apparatus and a water cleaning apparatus. The cleaned optical display unit W is transported to an inspection apparatus by a transporting mechanism. For example, the transporting mechanism includes a transporting roller, a transporting direction-switching mechanism, a rotary drive, a sensor, a controller, and so on. The polishing cleaning apparatus and the water cleaning apparatus will be described later.

(6-2) Inspection Step (S6-2 in FIG. 1). After the cleaning, the surface of the optical display unit W is typically inspected using an inspection apparatus. After the inspection, the optical display unit W is transported to the first bonding apparatus 18 by a transporting mechanism.

The steps of providing the first material roll, first inspecting, first cutting, bonding the first optical film, cleaning, and inspecting are each preferably performed on a continuous production line. The first optical film F11 is bonded to one side of the optical display unit W through a series of manufacturing steps as described above. A manufacturing process for bonding the second optical film F21 to the other side is described below.

(7) Step of Providing Second Material Roll (S11 in FIG. 1). The second roll of the second sheet material F2 described above is provided.

(8) Feeding Step (S12 in FIG. 1). The second sheet material F2 is unwound and fed from the prepared and placed second roll to the downstream side. For example, a second feeder 22 to feed the second sheet material includes a pair of nip rollers, a tension roller, a rotary drive, an accumulator A, a sensor, a controller, and so on.

(9) Second Inspecting Step (S13 in FIG. 1). The second sheet material F2 is inspected for defects with a second defect inspection apparatus 24. The defect inspection method may be the same as the above method using the first defect inspection apparatus.

(10) Second Cutting Step (S14 in FIG. 1). A second cutting apparatus 26 cuts each of the surface protecting film F23, the pressure-sensitive adhesive layer F25, the second optical film F21, and the second pressure-sensitive adhesive layer F24 into a specific size without cutting the second release film F22. Specifically, since the second roll has a width corresponding to the short side, the optical film is cut into a length corresponding to the long side. Concerning this embodiment, FIG. 3 shows an exemplary case where the second roll (the second sheet material F2) has a width corresponding to the long side of the optical display unit W.

For example, the cutting means may be a laser, a cutter, or any other known cutting means. The cutting means may be configured so that defects can not be included in the domain to be bonded on the optical display unit W by cutting based on the defect information obtained by the second defect inspection apparatus 24. This can significantly improve the yield of the second sheet material F2. The system may be configured so that the second sheet material F2 containing any defect can be rejected by a second rejection apparatus 29 as described later so as not to be bonded to the optical display unit W.

(11) Second Optical Film Bonding Step (S15 in FIG. 1). After the second cutting step, while the second release film F22 is removed using a second peeling apparatus 27, the second optical film F21 separated from the second release film F22 is bonded to the other side of the optical display unit W than the side bonded to the first optical film F11 with the second pressure-sensitive adhesive layer F24 interposed therebetween using a second bonding apparatus 28. Before the second optical film F21 is bonded to the optical display unit W, the optical display unit W may be turned by 90° using a transporting direction-switching mechanism of a transporting mechanism R so that the second optical film F21 can be arranged in crossed nicols relation to the first optical film F11.

In an preferred embodiment of the invention, therefore, the method further includes the step of turning the optical display unit W having undergone the first cutting and bonding process to the direction of bonding in the second cutting and bonding process or the step of turning the optical display unit W having undergone the second cutting and bonding process to the direction of bonding in the first cutting and bonding process. In a preferred embodiment of the invention, the turning step is performed so that the direction of the long side of the first optical film F11 bonded to the optical display unit W after the turning can make an angle of 0±5°, preferably 0±1°, with the direction of the long side of the second optical film F21 to be bonded after the cutting. For example, when the direction of the first optical film F11-feeding line is parallel to the direction of the second optical film F21-feeding line (including when they are on a straight line), the turning angle in the turning step is preferably from 85° to 95°. In the bonding step, as described later, the second optical film F21 and the optical display unit W may be press-bonded between a pair of rolls.

(12) Step of Inspecting Optical Display Device (S16 in FIG. 1). An inspection apparatus is used to inspect the optical display device with both sides bonded to the optical films. The defect inspection method may be a method of performing imaging and image processing on both sides of the optical display device with reflected light. Alternatively, the inspection method may be a method using a polarizing film for inspection placed between a CCD camera and the object to be inspected. Known methods may be used for the image processing algorithm. For example, defects may be detected by grayscale determination based on binarization.

(13) Defect information obtained by the inspection apparatus is used to determine whether the optical display device is non-defective. The optical display device determined as non-defective is transferred to the next mounting process. When determined as defective, it is subjected to a reworking process, in which a new optical film is bonded, and then the product is inspected. The product determined as non-defective is transferred to the mounting process, but the product determining as defective is subjected to the rewording process again or to disposal.

In a series of the manufacturing processes described above, the process of bonding the first optical film F11 and the process of bonding the second optical film F21 may be performed on a continuous production line so that the optical display unit can be manufactured in a preferred manner. In particular, each process may be performed in an isolated equipment in a factory so that the optical film can be bonded to the optical display unit in an environment with ensured cleanliness, which allows the production of optical display devices of high quality.

Another Mode of Skip Cut

Another mode of the first and second cutting steps is described below. This mode is particularly effective when the first inspection step and/or the second inspection step is not provided. Information about defects in each of the first and second sheet materials (such as coordinates of defects, defect type, and defect size) may be attached as coded information (e.g., QR code and bar code) to one widthwise end portion of each of the first and second rolls at a predetermined pitch (e.g., 1000 mm). In such a case, the coded information may be read and analyzed at a stage before cutting, and then in each of the first and second cutting steps, the material may be cut into a specific size so that the defects can be separated (this process is also referred to as skip cutting). The defect-containing portion can be rejected or bonded to a certain member other than the optical display unit and the cut piece of the sheet material having a specific size and determined as non-defective can be bonded to the optical display unit. This process significantly improves the yields of optical films.

Configuration of the Whole of Production System

Next, a description is given of the configuration of the whole of a production system for use in an embodiment of the invention. The production system for use in an embodiment of the invention may be a system for production of an optical display device including an optical display unit and an optically-anisotropic optical film bonded thereto, preferably a system for production of an optical display device including an optical display unit and an optical film that includes a polarizing plate and is bonded to the optical display unit. The production system for use in an embodiment of the invention includes a first cutting and boding apparatus for performing the first cutting and bonding process and a second cutting and bonding apparatus for performing the second cutting and bonding process.

FIG. 3 shows an exemplary system of this embodiment including an optical display unit W feeding apparatus M1, a first optical film F11 feeding apparatus M2, a first bonding apparatus M3 for bonding the first optical film F11, a feeder M4 for transporting and feeding the optical display unit W after the bonding, a second optical film F21 feeding apparatus M5, and a second bonding apparatus M6 for bonding the second optical film F21. In this example, the first cutting and bonding apparatus includes the first optical film F11 feeding apparatus M2 and the first bonding apparatus M3 for bonding the first optical film F11, and a second cutting and bonding apparatus includes the second optical film F21 feeding apparatus M5 and the second bonding apparatus M6 for bonding the second optical film F21.

Concerning this embodiment, FIG. 3 shows an example where the first optical film F11 feeding apparatus M2, the first bonding apparatus M3, the feeder M4, the second optical film F21 feeding apparatus M5, and the second bonding apparatus M6 are linearly arranged, and the feeding apparatus M1 is placed so that the optical display unit W can be fed in a direction perpendicular to the panel flow direction in the first bonding apparatus M3.

Configuration of Each Section in the Production System

An example of the configuration of each section in the production system for use in an embodiment of the invention is described below. FIG. 4 shows a first feeder 12, a first pre-inspection peeling apparatus 13, a first defect inspection apparatus 14, a first release film bonding apparatus 15, and a first cutting apparatus 16.

FIG. 5 shows a first peeling apparatus 17, a first bonding apparatus 18, and a first rejection apparatus 19. FIG. 6 shows a second feeder 22, a second pre-inspection peeling apparatus 23, a second defect inspection apparatus 24, a second release film bonding apparatus 25, and a second cutting apparatus 26. FIG. 7 shows a second peeling apparatus 27, a second bonding apparatus 28, and a second rejection apparatus 29.

The production system for use in an embodiment of the invention has the optical display unit feeding apparatus M1 to feed the optical display unit W. According to this embodiment, there is provided an example where the optical display unit feeding apparatus M1 includes a polishing cleaning apparatus, a water cleaning apparatus, and a dryer. In an embodiment of the invention, the optical display unit feeding apparatus M1 may include only a feeding mechanism R.

The production system for use in an embodiment of the invention has a first optical film feeding apparatus M2 that unwinds the long sheet material F1 including the first optical film F11 from a roll thereof, cuts it into a specific length, and then feeds the cut piece. According to this embodiment, there is provided an example where as shown in FIG. 4, the first optical film feeding apparatus M2 includes a first feeder 12, a first pre-inspection peeling apparatus 13, a first defect inspection apparatus 14, a first release film bonding apparatus 15, and a first cutting apparatus 16. In an embodiment of the invention, the first pre-inspection peeling apparatus 13, the first defect inspection apparatus 14, and the first release film bonding apparatus 15 are provided so that the first optical film can be inspected with high accuracy. However, these apparatuses may be omitted.

In an embodiment of the invention, the first optical film feeding apparatus M2 is configured so that it can cut the optical film into a length corresponding to the long or short side of the optical display unit, when the optical film has a width corresponding to the short or long side of the optical display unit. According to this embodiment, there is provided an example where the first optical film feeding apparatus M2 is configured to cut the optical film with a width corresponding to the short side of the optical display unit into a length corresponding to the long side of the optical display unit.

The first roll of the first long sheet material F1 is mounted on a roll mount apparatus that is geared to a motor or the like to rotate freely or at a certain speed. A controller 1 is provided to set the rotational speed and to control the drive.

The first feeder 12 is a feeding mechanism to feed the first sheet material F1 to the downstream side. The first feeder 12 is controlled by the controller 1.

The first pre-inspection peeling apparatus 13 is configured to peel off a release film H11 from the first sheet material F1 being fed and to wind it around a roll 132. The speed of winding it around the roll 132 is controlled by the controller 1. The peeling mechanism 131 has a sharp-ended knife edge and is configured so that the release film H11 can be peeled off by taking up the release film H11 with the knife edge and turning the direction of the feeding and that the first sheet material F1 peeled off from the release film H11 can be fed in the feeding direction.

The first defect inspection apparatus 14 inspects defects after the peeling of the release film H11. In the first defect inspection apparatus 14, image data taken by the CCD camera are analyzed so that defects can be detected and that their position coordinates can be calculated. The defect position coordinate data are used in the skip cut process with the first cutting apparatus 16 as described later.

The first release film bonding apparatus 15 bonds a release film H12 to the first optical film F11 with the first pressure-sensitive adhesive layer F14 interposed therebetween after the first defect inspection. As shown in FIG. 4, the release film H12 is unwound from a roll 151 of the release film H12, and the release film H12 and the first optical film F11 are inserted between one or more pairs of rollers 152 so that they are bonded to each other under a certain pressure from the pair of rollers 152. The rotational speed of the pair of rollers 152, the pressure, and the feeding are controlled by the controller 1.

The first cutting apparatus 16 cuts each of the first optical film F11, the surface protecting film 15, the first pressure-sensitive adhesive layer F14, and the pressure-sensitive adhesive layer 15 into a specific size without cutting the release film H12 after the bonding of the release film H12. For example, the first cutting apparatus 16 is a laser. Based on the defect position coordinates detected by the first defect inspection, the first cutting apparatus 16 performs cutting in such a manner that defective portions can be separated. Therefore, cut pieces having any defective portion are rejected as defective by the first rejection apparatus 19 in a later step. Alternatively, the first cutting apparatus 16 may ignore defective portions and continuously cut the material into a specific size. In this case, the bonding process may be designed not to bond, but to remove the defective portions as described later. In this case, the controller 1 may also function to control the process.

The production system for use in an embodiment of the invention has a first bonding apparatus 18 (M3) that bonds the first optical film F11 fed from the first optical film feeding apparatus M2 to one surface of the optical display unit W fed from the optical display unit feeding apparatus M1. According to this embodiment, there is provided an example where as shown in FIG. 5, the first bonding apparatus 18 (M3) has a press roller 181 and a guide roller 182 and also includes a first peeling apparatus 17 and a first rejection apparatus 19. The first rejection apparatus 19 has a rejection mechanism that works together with the first cutting apparatus 16 to cut and reject defective portions of the optical film. However, such a rejection mechanism may be omitted.

The first bonding apparatus 18 bonds the first sheet material F1 (first optical film F11) to the optical display unit W with the first pressure-sensitive adhesive layer F14 interposed therebetween, after the first sheet material F1 undergoes the cutting process and is peeled off from the release film H12 by the first peeling apparatus 17. The first sheet material F1 feeding route is placed above the optical display unit W feeding route.

In the bonding process, as shown in FIG. 5, the first optical film F11 is bonded to the surface of the optical display unit W, while it is pressed against the surface by the press roller 181 and the guide roller 182. The pressure from the press roller 181 and the guide roller 182 and the driving operation thereof are controlled by the controller 1.

The peeling mechanism 171 of the first peeling apparatus 17 has a sharp-ended knife edge and is configured so that the release film H12 can be peeled off by taking up the release film H12 with the knife edge and turning the direction of the feeding and that the first sheet material F1 (first optical film F11) peeled off from the release film H12 can be fed to the surface of the optical display unit W. The peeled release film H12 is wound around a roll 172. Winding it around the roll 172 is controlled by the controller 1.

Specifically, in an embodiment of the invention, the first optical film feeding apparatus M2 has a feeding mechanism that feeds the first optical film F11 to the first bonding apparatus M3 by using, as a carrying medium, the release film provided on the optical film with the pressure-sensitive adhesive layer interposed therebetween.

The bonding mechanism includes a press roller 181 and a guide roller 182 opposed thereto. The guide roller 182 includes a rubber roller whose rotation is driven by a motor, and is provided movable upward and downward. The press roller 181 including a metallic roller whose rotation is driven by a motor is provided movable upward and downward immediately above the guide roller 182. When the optical display unit W is fed to the bonding position, the press roller 181 is elevated to a position higher than the upper surface so that the space between the rollers is widened. Alternatively, the guide roller 182 and the press roller 181 may each be a rubber roller or a metallic roller. As described above, the system is configured so that the optical display unit W can be cleansed by any type of cleaning apparatus and fed by the feeding mechanism R. The feeding mechanism R is also controlled by the controller 1.

A description is given of the first rejection apparatus 19 to reject the first sheet material F1 having any defect. When the first sheet material F1 having a defect is transported to the bonding position, the guide roller 182 moves vertically downward. Subsequently, a roller 192 over which a remover film 191 is looped moves to the regular position of the guide roller 182. The press roller 181 is allowed to move vertically downward to press the defect-containing first sheet material F1 against the pressure-sensitive adhesive tape 191. Therefore, the defect-containing first sheet material F1 is bonded to the remover film 191 and wound around a roller 193 together with the remover film 191. The remover film 191 can adhere the first sheet material F1 containing a defect using the adhesive power of the first adhesive layer F14 of the first sheet material F1, but it is also possible to use pressure sensitive adhesive tape as a remover film 191

The optical display unit W having undergone the above process is transported to the downstream side, and the second optical film F21 (second sheet material F2) is bonded thereto. Hereinafter, the same or similar components will be described only briefly.

The production system for use in an embodiment of the invention has a feeder M4 for transporting and feeding the optical display unit W after the bonding of the first optical film F11. The feeder M4 preferably has a turning mechanism 20 that turns the optical display unit W to the direction of bonding in the second bonding apparatus 28, after the bonding in the first bonding apparatus 18.

For example, when the second optical film F21 is bonded in 90° relation (crossed nicols relation) with the first optical film F11, the optical display unit W is turned by 90° by the feeding direction-switching mechanism (turning mechanism 20) of the feeding mechanism R, and then the second optical film F21 is bonded thereto. The method described below for bonding the second sheet material F2 includes performing each step, while keeping the second sheet material F2 turned upside down (with the release film facing upward), and bonding the second optical film F21 to the lower side of the optical display unit W.

The production system for use in an embodiment of the invention has a second optical film feeding apparatus M5 that unwinds the long sheet material F2 including the second optical film F21 from a roll thereof, cuts it into a specific length, and then feeds the cut piece. According to this embodiment, there is provided an example where as shown in FIG. 6, the second optical film feeding apparatus M5 includes a second feeder 22, a second pre-inspection peeling apparatus 23, a second defect inspection apparatus 24, a second release film bonding apparatus 25, and a second cutting apparatus 26. In an embodiment of the invention, the second pre-inspection peeling apparatus 23, the second defect inspection apparatus 24, and the second release film bonding apparatus 25 are provided so that the second optical film can be inspected with high accuracy. However, these apparatuses may be omitted.

In an embodiment of the invention, the second optical film feeding apparatus M5 is configured so that it can cut the optical film into a length corresponding to the long or short side of the optical display unit W, when the optical film has a width corresponding to the short or long side of the optical display unit W. According to this embodiment, there is provided an example where the second optical film feeding apparatus M5 is configured to cut the optical film F21 with a width corresponding to the long side of the optical display unit W into a length corresponding to the short side of the optical display unit W.

As shown in FIG. 6, the second roll of the second long sheet material F2 is mounted on a roll mount apparatus that is geared to a motor or the like to rotate freely or at a certain speed. A controller 1 is provided to set the rotational speed and to control the drive.

The second feeder 22 is a feeding mechanism to feed the second sheet material F2 to the downstream side. The second feeder 22 is controlled by the controller 1.

The second pre-inspection peeling apparatus 23 is configured to peel off a release film H21 from the second sheet material F2 being fed and to wind it around a roll 232. The speed of winding it around the roll 232 is controlled by the controller 1. The peeling mechanism 231 has a sharp-ended knife edge and is configured so that the release film H21 can be peeled off by taking up the release film H21 with the knife edge and turning the direction of the feeding and that the second sheet material F2 peeled off from the release film H21 can be fed in the feeding direction.

The second defect inspection apparatus 24 inspects defects after the peeling of the release film H21. In the second defect inspection apparatus 24, image data taken by the CCD camera are analyzed so that defects can be detected and that their position coordinates can be calculated. The defect position coordinate data are used in the skip cutting process with the second cutting apparatus 26 as described later.

The production system for use in an embodiment of the invention has a second bonding apparatus 28 (M6) that bonds the second optical film F21 fed from the second optical film feeding apparatus M5 to the other surface of the optical display unit W fed from the feeder M4. According to this embodiment, there is provided an example where as shown in FIG. 7, the second bonding apparatus 28 (M6) has a press roller 281 and a guide roller 282 and also includes a second peeling apparatus 27 and a second rejection apparatus 29. The second rejection apparatus 29 has a rejection mechanism that works together with the second cutting apparatus 26 to cut and reject defective portions of the optical film. However, such a rejection mechanism may be omitted.

The second release film bonding apparatus 25 bonds a release film H22 to the second optical film F21 with the second pressure-sensitive adhesive layer F24 interposed therebetween after the second defect inspection. As shown in FIG. 6, the release film H22 is unwound from a roll 251 of the release film H22, and the release film H22 and the second optical film F21 are inserted between one or more pairs of rollers 252 so that they are bonded to each other under a certain pressure from the pair of rollers 252. The rotational speed of the pair of rollers 252, the pressure, and the feeding are controlled by the controller 1.

The second cutting apparatus 26 cuts each of the second optical film F21, the surface protecting film 25, the second pressure-sensitive adhesive layer F24, and the pressure-sensitive adhesive layer 25 into a specific size without cutting the release film H22 after the bonding of the release film H22. For example, the second cutting apparatus 26 is a laser. Based on the defect position coordinates detected by the second defect inspection, the second cutting apparatus 26 performs cutting in such a manner that defective portions can be separated. Therefore, cut pieces having any defective portion are rejected as defective by the second rejection apparatus 29 in a later step. Alternatively, the second cutting apparatus 26 may ignore defective portions and continuously cut the material into a specific size. In this case, the bonding process may be designed not to bond, but to remove the defective portions as described later. In this case, the controller 1 may also function to control the process.

The second bonding apparatus 28 bonds the second sheet material F2 (second optical film F21) to the optical display unit W with the second pressure-sensitive adhesive layer F24 interposed therebetween, after the second sheet material F2 undergoes the cutting process and is peeled off from the release film H22 by the second peeling apparatus 27. In the bonding process, as shown in FIG. 7, the second optical film F21 is bonded to the surface of the optical display unit W, while it is pressed against the surface by the press roller 281 and the guide roller 282. The pressure from the press roller 281 and the guide roller 282 and the driving operation thereof are controlled by the controller 1.

The peeling mechanism 271 of the second peeling apparatus 27 has a sharp-ended knife edge and is configured so that the release film H22 can be peeled off by taking up the release film H22 with the knife edge and turning the direction of the feeding and that the second sheet material F2 (second optical film) peeled off from the release film H22 can be fed to the surface of the optical display unit W. The peeled release film H22 is wound around a roll 272. Winding it around the roll 272 is controlled by the controller 1.

Specifically, in an embodiment of the invention, the second optical film feeding apparatus M5 has a feeding mechanism that feeds the second optical film F21 to the second bonding apparatus M6 by using, as a carrying medium, the release film provided on the optical film with the pressure-sensitive adhesive layer interposed therebetween.

The bonding mechanism includes a press roller 281 and a guide roller 282 opposed thereto. The guide roller 282 includes a rubber roller whose rotation is driven by a motor, and is provided movable upward and downward. The press roller 281 including a metallic roller whose rotation is driven by a motor is provided movable upward and downward immediately below the guide roller 282. When the optical display unit W is fed to the bonding position, the press roller 281 is shifted to a lower position so that the space between the rollers is widened. Alternatively, the guide roller 282 and the press roller 281 may each be a rubber roller or a metallic roller.

A description is given of the second rejection apparatus 29 to reject the second sheet material F2 having any defect. When the second sheet material F2 having a defect is fed to the bonding position, the guide roller 282 moves vertically upward. Subsequently, a roller 292 over which a remover film 291 is looped moves to the regular position of the guide roller 282. The press roller 281 is allowed to move vertically upward to press the defect-containing second sheet material F2 against the remover film 291. Therefore, the defect-containing second sheet material F2 is bonded to the remover film 291 and wound around a roller 293 together with the remover film 291.

The optical display device to which the first and second sheet materials are bonded is fed to an inspection apparatus. The inspection apparatus inspects both sides of the optical display device transported thereto. The light source and a half mirror are used to vertically illuminate the upper surface of the optical display device, and the reflected light is captured as image data by a CCD camera. The opposite surface is also inspected using a light source and a CCD camera. The light source also illuminates the surface of the optical display device at a certain angle, and the reflected light is captured as image data by the CCD camera. The opposite surface is also inspected using the light source and the CCD camera. These image data are subjected to image analysis to determine whether the product is defective.

For example, the timing of the operation of each apparatus is calculated by a method using sensors placed at specific locations or by a method of detecting the rotating part of the feeder or the feeding mechanism R with a rotary encoder or the like. The controller 1 may be implemented in cooperation with software programs and hardware resources such as CPU and memories. In this case, program software, procedures, various settings, and so on are previously stored in memories. Private circuits, firmware, or the like may also be used for the implementation.

The set of material rolls according to the invention is preferably used to form an image display device (corresponding to the optical display device) such as a liquid crystal display device, an organic electroluminescence (EL) display device or a plasma display panel (PDP).

The set of material rolls according to the invention is preferably used to form any of various devices such as liquid crystal display devices. Liquid crystal display devices may be formed according to conventional techniques. Specifically, a liquid crystal display device may be typically formed by assembling a liquid crystal cell (corresponding to the optical display unit) and optical films, and optional components such as a lighting system and incorporating a driving circuit, according to any conventional techniques, except that the set of material rolls are used according to the invention. The liquid crystal cell to be used may also be of any type such as TN type, STN type or π type. For example, a VA or IPS mode liquid crystal panel is effectively used as the liquid crystal cell in an embodiment of the invention. FIG. 10 shows the liquid crystal panel of VA Mode or IPS Mode and the direction of the absorption axis of the polarizing plate bonded on the both sides thereof. As shown in this figure, in the case of VA Mode or IPS Mode, it is important that the absorption axis A11 of the first polarizing plate becomes parallel to the long side of the optical display unit W which is a liquid crystal panel, and the absorption axis A21 of the second polarizing plate becomes parallel to the short side.

Any appropriate liquid crystal display device may be formed such as a liquid crystal display device including a liquid crystal cell and the optical film placed on both sides of the liquid crystal cell or a liquid crystal display device using a backlight or a reflector in a lighting system. In that case, the set of material rolls according to the invention may be used for the both sides of the liquid crystal cell. The optical films placed on both sides may be the same or different. In the process of forming the liquid crystal display device, one or more layers of an additional appropriate component or components such as a diffusion plate, an antiglare layer, an antireflection film, a protective plate, a prism array, a lens array sheet, a light diffusion plate, and a backlight may also be placed at an appropriate location or locations.

The set of material rolls according to the invention is preferably used to form various devices such as liquid crystal display devices. The set of material rolls according to the invention may be placed the both sides of a liquid crystal cell to form a liquid crystal display device having an appropriate structure according to conventional techniques, such as a transmissive, reflective or transflective liquid crystal display device. The liquid crystal cell used to form a liquid crystal display device may be of any type. Any appropriate type of liquid crystal cell such as an active matrix driving type typified by a thin film transistor type may be used.

The polarizing plates or the optical components provided on both sides of a liquid crystal cell may be the same or different. In the process of forming a liquid crystal display device, one or more layers of an additional appropriate component or components such as a prism array sheet, a lens array sheet, a light diffusion plate, and a backlight may be placed at an appropriate location or locations.

Other Embodiments of the Production System

The respective apparatuses of the production system for use in an embodiment of the invention may be arranged in any other way. For example, the optical display unit W feeding apparatus M1, the first optical film F11 feeding apparatus M2, and the first bonding apparatus M3 may be linearly arranged. At the same time, the second optical film F21 feeding apparatus M5 and the second bonding apparatus M6 may be arranged parallel thereto, and the feeder M4 may be placed between the first bonding apparatus M3 and the second bonding apparatus M6.

In an embodiment of the invention, the mechanism to turn the optical display unit W may be omitted. In such a case, the first optical film F11 feeding apparatus M2 and the first bonding apparatus M3 are preferably arranged perpendicular to the second optical film F21 feeding apparatus M5 and the second bonding apparatus M6.

What is claimed is:

1. A set of material rolls for use in the process of cutting them, respectively, into specific-length pieces to be bonded to both sides of an optical display unit, comprising:
    a first roll that is a roll of a long sheet material including a first optical film, a pressure-sensitive adhesive layer and a release film laminated in this order, wherein the first optical film includes a polarizing plate having an absorption axis parallel to the longitudinal direction of the long sheet material, and having undergone a slitting process in a direction parallel to the absorption axis of the polarizing plate so that it has a width corresponding to a short side of the optical display unit; and
    a second roll that is a roll of a long sheet material including a second optical film, a pressure-sensitive adhesive layer and a release film laminated in this order, wherein the second optical film includes a polarizing plate having an absorption axis parallel to the longitudinal direction of the long sheet material, and having undergone a slitting process in a direction parallel to the absorption axis of the polarizing plate so that it has a width corresponding to a long side of the optical display unit.

2. The set of material rolls according to claim 1, wherein a ratio of the long side of the optical display unit to the short side of the optical display unit is 16/9 or 4/3.

* * * * *